(12) United States Patent
Ukon et al.

(10) Patent No.: US 8,522,539 B2
(45) Date of Patent: Sep. 3, 2013

(54) GAS PRESSURE ACTUATOR

(75) Inventors: Tetsuya Ukon, Osaka (JP); Teruaki Tsuchiya, Osaka (JP); Futoshi Okugawa, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 791 days.

(21) Appl. No.: 12/676,323

(22) PCT Filed: Sep. 4, 2008

(86) PCT No.: PCT/JP2008/002439
§ 371 (c)(1),
(2), (4) Date: Mar. 3, 2010

(87) PCT Pub. No.: WO2009/031310
PCT Pub. Date: Mar. 12, 2009

(65) Prior Publication Data
US 2010/0199654 A1    Aug. 12, 2010

(30) Foreign Application Priority Data

Sep. 4, 2007  (JP) .................................. 2007-228580

(51) Int. Cl.
*F15B 15/19*   (2006.01)
(52) U.S. Cl.
USPC ............................. 60/407; 60/636; 180/274
(58) Field of Classification Search
USPC .................. 180/274; 92/169.1; 60/407, 632, 60/636
See application file for complete search history.

(56) References Cited

U.S. PATENT DOCUMENTS

| 4,281,884 | A | 8/1981 | Freitag et al. |
| 6,648,110 | B2 * | 11/2003 | Nakamura ............... 188/322.12 |
| 7,219,780 | B2 | 5/2007 | Thurmann et al. |
| 7,412,956 | B2 * | 8/2008 | Gotou et al. ............... 123/193.2 |
| 2002/0011371 | A1 * | 1/2002 | Sasaki et al. ................. 180/274 |
| 2004/0144605 | A1 | 7/2004 | Thurmann et al. |
| 2004/0150210 | A1 | 8/2004 | Cunningham et al. |
| 2006/0157311 | A1 | 7/2006 | Mauer |

FOREIGN PATENT DOCUMENTS

| EP | 1867527 A1 | 12/2007 |
| JP | 52-125984 A | 10/1977 |
| JP | 59-106785 A | 6/1984 |
| JP | 4-96603 U | 8/1992 |
| JP | 7-125609 A | 5/1995 |
| JP | 8-300504 A | 11/1996 |
| JP | 2000-33850 A | 2/2000 |
| JP | 2003-4008 A | 1/2003 |
| JP | 2003-191866 A | 7/2003 |
| JP | 2004-156783 A | 6/2004 |
| JP | 2004156783 A * | 6/2004 |
| JP | 2004-330912 A | 11/2004 |
| JP | 2004-330913 A | 11/2004 |

(Continued)

*Primary Examiner* — Edward Look
*Assistant Examiner* — Logan Kraft
(74) *Attorney, Agent, or Firm* — Birch, Stewart, Kolasch & Birch, LLP (57) ABSTRACT

Disclosed is a gas pressure actuator whose actuator body has a cylinder, a piston and a gas generator in which a powder is loaded, and the gas generator is positioned at an end portion of the cylinder. The gas generator injects a high pressure gas into the cylinder by the combustion of the powder, thereby moving the piston. The actuator body is provided with a coating which covers the entire actuator body from outside. The coating is a resin coating having electrically insulating, waterproof, and dustproof characteristics.

8 Claims, 7 Drawing Sheets

(56) References Cited

FOREIGN PATENT DOCUMENTS

| | | |
|---|---|---|
| JP | 2005-254834 A | 9/2005 |
| JP | 2006-170444 A | 6/2006 |
| JP | 2006-199179 A | 8/2006 |
| JP | 2007-192405 A | 8/2007 |
| JP | 2007192405 A * | 8/2007 |
| JP | 2008-56068 A | 3/2008 |

* cited by examiner

GAS PRESSURE ACTUATOR

TECHNICAL FIELD

The present invention relates to gas pressure actuators, and specifically to a coating of the actuator body.

BACKGROUND ART

Some types of explosive actuators, which are gas pressure actuators, have been used in various types of vehicles as shown in Patent Document 1. The explosive actuator includes a cylinder, a piston, and a gas generator. For example, when a collision detection sensor detects a collision, powders loaded in the gas generator are burned and the gas generator injects high pressure gas into the cylinder, which triggers a shift of the piston. As a result of this shift, the piston lifts the engine hood to ensure significant deformation of the engine hood in a pedestrian collision.

Citation List

Patent Document

PATENT DOCUMENT 1: Japanese Patent Publication No. 2004-330912

SUMMARY OF THE INVENTION

Technical Problem

However, the actuator body of the conventional explosive actuator is constituted by simply providing a piston in a cylinder and providing a gas generator to the cylinder.

Thus, it is necessary to provide a sealing structure in order to prevent entry of foreign materials into a sealing portion between the cylinder and the piston. In addition, it is necessary to use a special waterproof connector as an electrical terminal of the gas generator.

According to this structure, each component, such as the above-described sealing portion and the electrical terminal, needs to be provided with a special structure. This increases complexity of the structure of the actuator body, and increases the cost as a result of an increased number of parts.

The present invention was made in view of the above problems, and it is an objective of the invention to simplify the structure of the actuator body in which no special structure for each component is necessary, and to reduce the cost by reducing the number of parts.

Solution to the Problem

According to the present invention, at least part of the actuator body (26) is covered.

The first aspect of the present invention is intended for a gas pressure actuator whose actuator body (26) has a cylinder (21), a piston (22), and a gas generator (25) in which a gas generating agent is loaded, the gas generator (25) injecting a high pressure gas into the cylinder (21) as a result of a reaction of the gas generating agent, and thereby moving the piston (22). The actuator body (26) is provided with a coating (30) which covers at least an end portion of the cylinder (21) from outside.

The second aspect of the present invention according to the first aspect of the invention is that the coating (30) covers the entire actuator body (26) from outside.

The third aspect of the present invention according to the first or second aspect of the invention is that the coating (30) is a resin coating having waterproof characteristics.

The fourth aspect of the present invention according to the first or second aspect of the invention is that the coating (30) is a resin coating having dustproof characteristics.

The fifth aspect of the present invention according to the first or second aspect of the invention is that the coating (30) is a resin coating having electrically insulating characteristics.

The sixth aspect of the present invention according to any one of the first to fifth aspects of the invention is that the coating (30) includes a thinned portion (31) on a circumferential surface of the actuator body (26) at a contact portion between the cylinder (21) and the piston (22).

The seventh aspect of the present invention according to any one of the first to sixth aspects of the invention is that the gas generator (25) is positioned at an end portion of the cylinder (21).

The eighth aspect of the present invention according to any one of the first to sixth aspects of the invention is that the gas generator (25) is positioned at an end portion of the piston (22) inside the cylinder (21).

As described, according to the first aspect of the present invention, at least part of the actuator body (26) is covered with the coating (30). Thus, the coating (30) prevents the entry of foreign matters into a sealing portion between the cylinder (21) and the piston (22). In addition, the coating (30) provides waterproofing properties to the electrical terminal of the gas generator (25).

In particular, according to the second aspect of the present invention, the entire actuator body (26) is covered with the coating (30), and therefore, entry of foreign matters is reliably prevented.

According to the third aspect of the present invention, the coating (30) has waterproof characteristics. Thus, waterproofing of an electrical terminal etc. is reliably ensured.

According to the fourth aspect of the present invention, the coating (30) has dustproof characteristics. Thus, entry of foreign matters into the sealing portion is reliably prevented.

According to the fifth aspect of the present invention, the coating (30) has electrically insulating characteristics. This means that electrically insulating characteristics are ensured and safety is increased. Here, the gas generator (25) is actuated by an electrical signal. Therefore, static electricity and a stray current may cause malfunction of the gas generator (25). The actuator body (26) is covered with the electrically insulating coating (30) according to the fourth aspect of the present invention. Therefore, malfunction of the gas generator (25) is reliably prevented. The electrically insulating coating (30) may be made of fluororesin, for example.

According to the sixth aspect of the present invention, the coating (30) includes a thinned portion (31). Since the coating (30) is fractured at the thinned portion (31) when the actuator body (26) is actuated, the coating (30) does not prevent the actuation of the actuator body (26).

According to the seventh aspect of the present invention, although the gas generator (25) is positioned outside the actuator body (26), reliable waterproofing is provided.

According to the eighth aspect of the present invention, the gas generator (25) is positioned at the piston (22) inside the cylinder (21). In addition to that, reliable waterproofing etc. is provided.

Advantages of the Invention

According to the present invention, the actuator body (26) is covered with the coating (30), and therefore, sealing and waterproofing between components can be achieved by the single coating (30). This means that the single coating (30) eliminates the need to provide a special structure for each component. Consequently, it is possible to simplify the structure of the actuator body (26) and reduce the number of parts and costs.

Since the actuator body (26) is covered with the coating (30), the actuator body (26) can have a cushioned surface. This can ensure shock absorption during the handling of the actuator body (26). In particular, the gas generator (25) contains a gas generating agent such as a powder. Therefore, the shock absorption characteristics can increase safety.

The coating (30) may be made of a nonskid material. Thus, safety during the handling of the actuator body (26) can be improved.

In particular, according to the second aspect of the present invention, the entire actuator body (26) is covered with the coating (30). Thus, reliable waterproofing etc. is possible.

According to the third aspect of the present invention, the coating (30) has waterproof characteristics and the gas generator (25) is covered with the coating (30) as well. Thus, reliable waterproofing of an electrical terminal etc. is possible.

According to the fourth aspect of the present invention, the coating (30) has dustproof characteristics. Thus, the entry of foreign materials into the sealing portion between the cylinder (21) and the piston (22) can be reliably prevented.

According to the fifth aspect of the present invention, the coating (30) has electrically insulating characteristics. Thus, malfunction due to static electricity and stray current can be reliably prevented. As a result, the electrical insulation of the actuator body (26) can be ensured, and this can increase safety.

According to the sixth aspect of the present invention, the coating (30) includes the thinned portion (31). Thus, the coating (30) can be reliably fractured at the thinned portion (31) when the actuator body (26) is actuated. As a result, an increase in force of the coating (30) that prevents the actuation of the actuator body (26) can be reliably prevented.

According to the seventh aspect of the present invention, the gas generator (25) is provided with reliable waterproofing. Therefore, the gas generator (25) can be positioned on the outside of the actuator body (26). This can increase the flexibility of the arrangement of the gas generator (25).

According to the eighth aspect of the present invention, the gas generator (25) is positioned at the piston (22) inside the cylinder (21). In addition to that, reliable waterproofing etc. is provided. This can increase the safety.

DESCRIPTION OF REFERENCE CHARACTERS

3 Engine Hood
20 Explosive Actuator
21 Cylinder
22 Piston
25 Gas Generator
26 Actuator Body
30 Coating
31 Thinned Portion Description of Embodiments Embodiments of the present invention will be described in detail hereinafter referencing the drawings.

<Embodiment 1>

Figure 1:
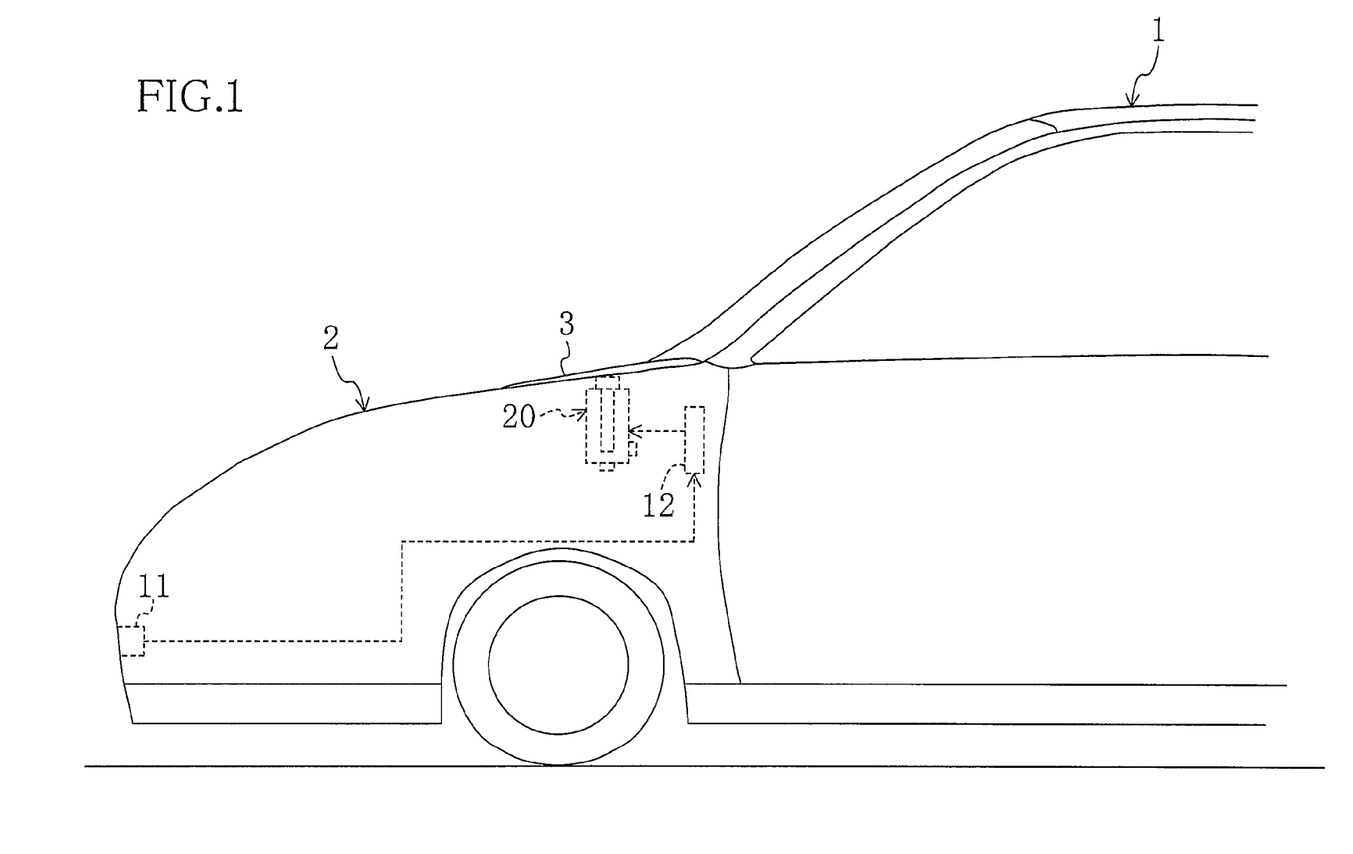
FIG. 1 is a side view of the front side of a vehicle in which an explosive actuator of Embodiment 1 is used.

As shown in FIG. 1, a gas pressure actuator of the present embodiment is constituted by an explosive actuator (20). The explosive actuator (20) constitutes a component of a safety device mounted in a vehicle (1). The safety device is provided to absorb shock of a secondary collision of a pedestrian who comes into collision with a front end portion of the vehicle (1).

The safety device includes a collision detection sensor (11), a controller (12), and the explosive actuator (20), which are connected together through an electrical connection. The collision detection sensor (11) is provided at a front end portion of the vehicle (1). The collision detection sensor (11) is configured to output a collision detection signal to the controller (12) when the collision detection sensor (11) detects a pedestrian collision with the front end portion of the vehicle (1). The controller (12) is provided in an engine compartment (2) of the vehicle (1). The controller (12) is configured to output an actuation signal to the explosive actuator (20) immediately after the controller (12) receives the collision detection signal from the collision detection sensor (11).

Figure 3:
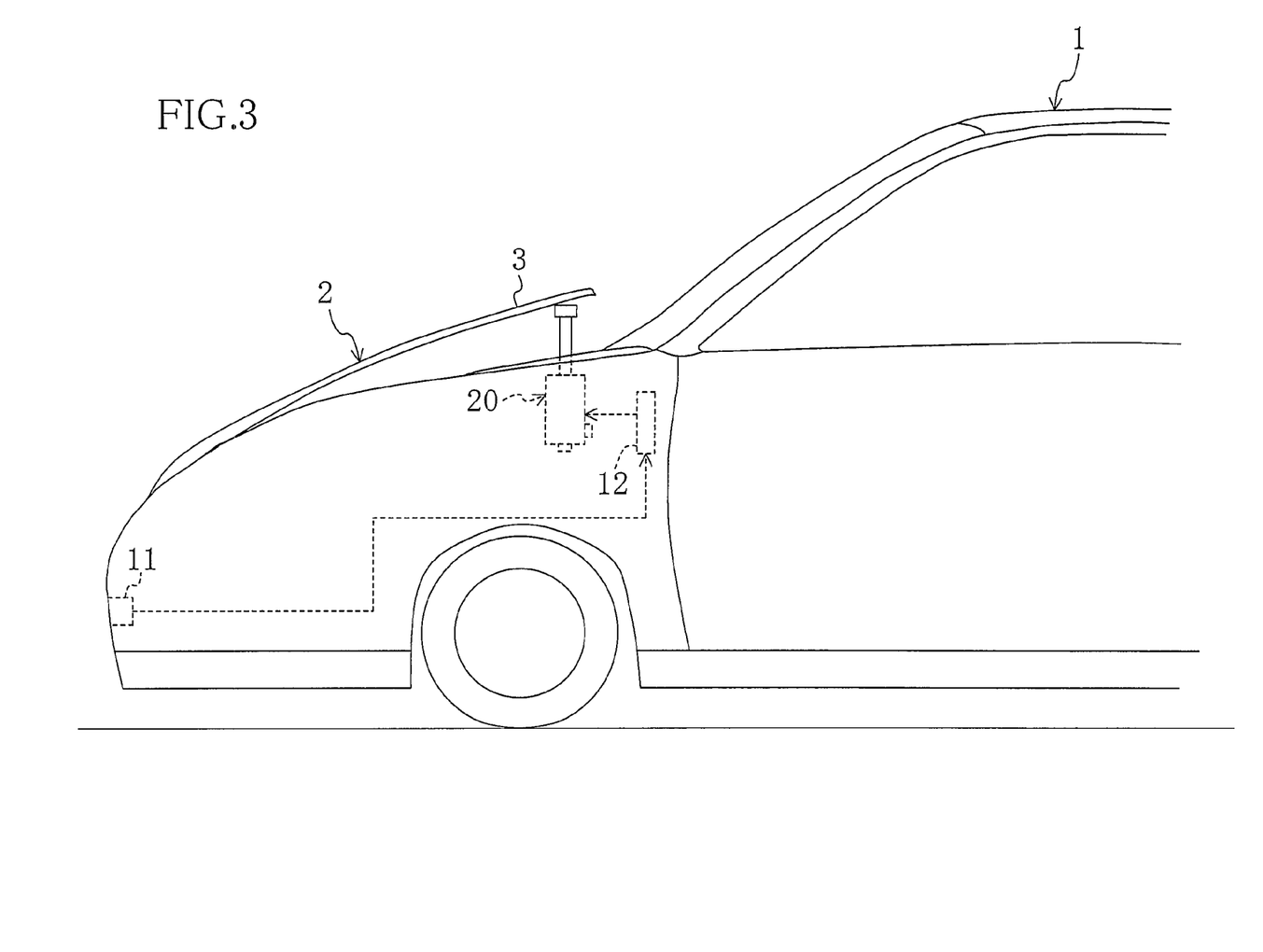
FIG. 3 is a side view of the front side of a vehicle after the actuation of the explosive actuator of Embodiment 1.

The explosive actuator (20) is positioned under an openable engine hood (3) provided above the engine compartment (2) of the vehicle (1). As shown in FIG. 3, the explosive actuator (20) forces the engine hood (3) to pop up when the explosive actuator (20) receives the actuation signal from the controller (12). The explosive actuator (20) will be described in detail hereinafter.

Figure 2:
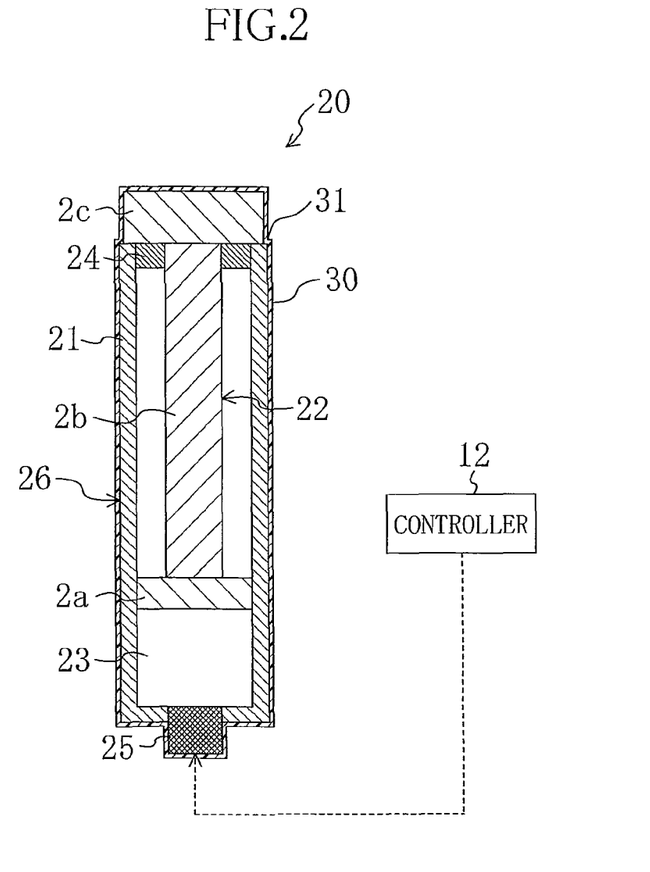
FIG. 2 is a longitudinal sectional view of the explosive actuator of Embodiment 1.

As shown in FIG. 2, the explosive actuator (20) includes a cylinder (21), a piston (22) provided in the cylinder (21), and a gas generator (25) for injecting high pressure gas to a gas chamber (23) formed by partitioning the cylinder (21).

The cylinder (21) has a cylindrical shape, of which one end (upper end) is open and the other end (lower end) is closed. A bush (24) is attached to the opening of the upper end of the cylinder (21). A central portion of the bush (24) is provided with a bush hole which goes through the bush (24) along an axis of the cylinder (21).

The piston (22) includes a disk-like piston portion (2a), a rod portion (2b), and a disk-like head portion (2c). The piston portion (2a) is inserted in the cylinder (21) and is movable in the cylinder (21) along the axis of the cylinder (21). The space between the piston portion (2a) and the closed end of the cylinder (21) is the gas chamber (23).

One end (lower end) of the rod portion (2b) is connected to the piston portion (2a), and the other end (upper end) of the rod portion (2b) is connected to the head portion (2c). Further, the rod portion (2b) passes through the bush hole, and the upper end of the rod portion (2b) is exposed to the outside of the cylinder (21).

When the explosive actuator (20) is actuated, the head portion (2c) comes in contact with the engine hood (3) and lift the engine hood (3).

The gas generator (25) is attached to the closed end of the cylinder (21). Although not shown, the gas generator (25) includes a closed container which can be exploded, a gas generating agent (e.g., a powder) contained in the closed container, and an ignition system for igniting the gas generating agent. An electrical connection extending from the controller (12) is connected to the ignition system via an electrical terminal.

The cylinder (21), the piston (22) and the gas generator (25) constitute an actuator body (26).

One of characteristic features of the present invention is a coating (30) provided to the actuator body (26). The coating (30) covers the entire actuator body (26) from outside, and is made of a resin coating having waterproof and dustproof characteristics.

That is, the coating (30) covers the actuator body (26) from the outer surface of the head portion (2c) through the outer surface of the cylinder (21) to the outer surface of the gas generator (25), while the explosive actuator (20) is in the non-actuation state in which the rod portion (2b) of the piston (22) is positioned completely inside the cylinder (21). The coating (30) covers a contact portion between the head portion (2c) and the cylinder (21), as well as the electrical terminal of the gas generator (25), to prevent entry of moisture and foreign materials.

The coating (30) may be made of a resin coating having electrically insulating, waterproof, and dustproof characteristics. For example, the coating (30) may be made of an antistatic coating material such as fluororesin.

Here, the gas generator (25) is actuated by an electrical signal. Therefore, static electricity and a stray current may cause malfunction of the gas generator (25). Thus, covering the actuator body (26) with the electrically insulating coating (30) can reliably prevent the malfunction of the gas generator (25).

Further, the coating (30) includes a thinned portion (31) on a circumferential surface of the actuator body (26) at a contact portion between the cylinder (21) and the piston (22). Specifically, the thinned portion (31) of the coating (30) corresponds to a corner of the step between the open end of the cylinder (21) and the edge of the head portion (2c). The thinned portion (31) is configured such that the coating (30) is fractured by the projection of the piston (22) from the cylinder (21) when the actuator body (26) is actuated.

-Operational Behavior-

Next, behavior of the explosive actuator (20) will be described hereinafter.

First, when the collision detection sensor (11) detects a pedestrian collision, an actuation signal is sent from the controller (12) to the explosive actuator (20). The actuation signal is an ignition signal input to the ignition system of the gas generator (25).

In the explosive actuator (20), the ignition signal input to the ignition system triggers actuation of the ignition system and combustion of the powder, in other words, the gas generating agent starts to react. The reaction of the gas generating agent causes the closed container to be filled with high pressure gas. This increases the pressure in the closed container and causes an explosion of the closed container. As a result, the high pressure gas is injected into the gas chamber (23).

Figure 4:
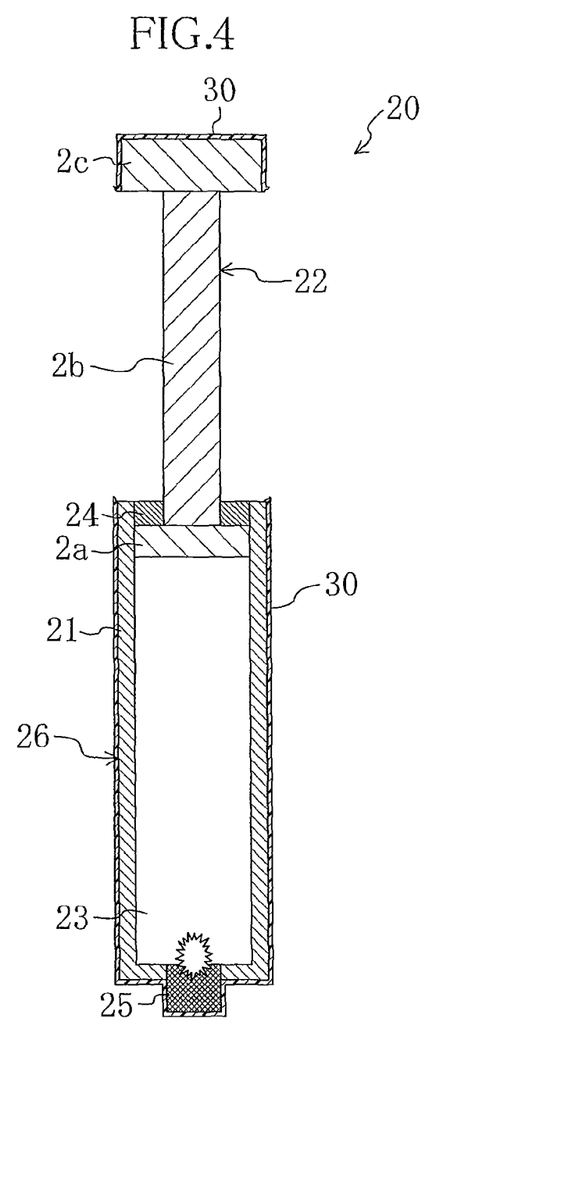
FIG. 4 is a longitudinal sectional view of the explosive actuator of Embodiment 1 after the actuation of the explosive actuator.

Here, the injecting force of the high pressure gas provides momentum to the piston (22). As a result, the piston (22) projects from the upper end of the cylinder (21) as shown in FIG. 4. Due to this projection of the piston (22), the head portion (2c) comes in contact with the engine hood (3) of the vehicle (1) and lifts the engine hood (3) as shown in FIG. 3.

While the explosive actuator (20) is in the non-actuation state, the rod portion (2b) of the piston (22) is positioned completely inside the cylinder (21). In the non-actuation state, the entire actuator body (26) is covered with the coating (30) from outside. The rod portion (2b) projects from the cylinder (21) when the ignition signal is input to the ignition system, and thereby fracturing the coating (30) at the thinned portion (31) as shown in FIG. 4.

—Advantages of Embodiment 1—

According to the present invention, the actuator body (26) is covered with the coating (30). Thus, sealing and waterproofing between components can be achieved by the single coating (30). Thus, the single coating (30) eliminates the need to provide a special structure for each component. Consequently, it is possible to simplify the structure of the actuator body (26) and reduce the number of parts and costs.

In particular, the explosive actuator (20) is used only one time when a collision occurs, and similarly, the coating (30) is fractured only one time. For this reason, there are few limitations on the composition and the structure, and thus, a simple coating structure is possible.

Since the entire actuator body (26) is covered with the coating (30), reliable waterproofing is possible.

Since the coating (30) has waterproof characteristics and the gas generator (25) is covered with the coating (30) as well, reliable waterproofing of an electrical terminal etc. is possible.

Since the coating (30) has dustproof characteristics, the entry of foreign materials to the sealing portion between the cylinder (21) and the piston (22) can be reliably prevented.

Since the coating (30) has electrically insulating characteristics, malfunction due to static electricity and stray current can be reliably prevented. Thus, the electrical insulation of the actuator body (26) can be ensured, and this can increase safety.

Since the coating (30) includes the thinned portion (31), the coating (30) can be reliably fractured at the thinned portion (31) when the actuator body (26) is actuated. As a result, an increase in force of the coating (30) that prevents the actuation of the actuator body (26) can be reliably prevented.

Since the gas generator (25) is provided with reliable waterproofing, the gas generator (25) can be positioned on the outside of the actuator body (26). This can increase the flexibility of the arrangement of the gas generator (25).

Since the actuator body (26) is covered with the coating (30), the actuator body (26) can have a cushioned surface. This can ensure shock absorption during the handling of the actuator body (26). In particular, the gas generator (25) contains a gas generating agent such as a powder. Therefore, the shock absorption characteristics can increase safety.

The coating (30) may be made of a nonskid material. Thus, safety during the handling of the actuator body (26) can be improved.

<Embodiment 2>

Figure 5:
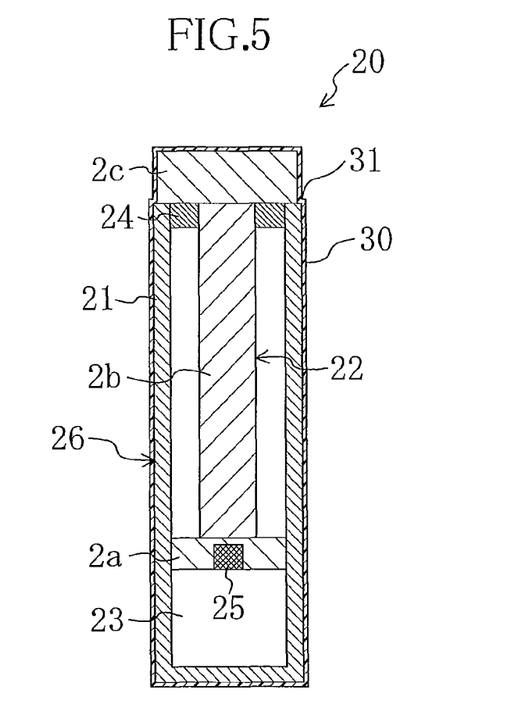
FIG. 5 is a longitudinal sectional view of an explosive actuator of Embodiment 2.
Figure 6:
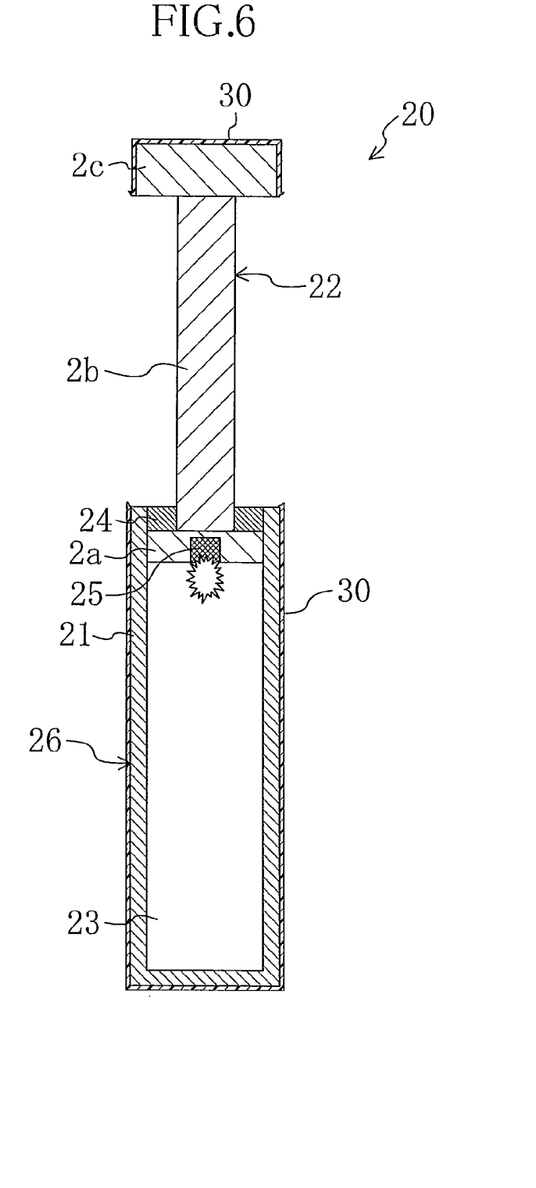
FIG. 6 is a longitudinal sectional view of the explosive actuator of Embodiment 2 after the actuation of the explosive actuator.

According to Embodiment 1, the gas generator (25) is attached to the closed end of the cylinder (21), whereas according to the present embodiment, the gas generator (25) is attached to the piston (22) as shown in FIGS. 5 and 6.

Specifically, the gas generator (25) is attached in a recess which is open in an end surface of the piston portion (2a) of the piston (22) on the gas chamber (23) side. That is, the gas generator (25) is positioned in the interior of the cylinder (21), and faces the gas chamber (23). The other structures are the same as the structures in Embodiment 1.

While the explosive actuator (20) is in the non-actuation state, the rod portion (2b) of the piston (22) is positioned completely inside the cylinder (21) as shown in FIG. 5. In the non-actuation state, the coating (30) covers the entire actuator body (26) from outside. The rod portion (2b) projects from the cylinder (21) when the ignition signal is input to the ignition system, thereby fracturing the coating (30) at the thinned portion (31) as shown in FIG. 6.

As described above, according to the present embodiment, the gas generator (25) is provided at the piston (22) inside the cylinder (21). In addition to that, reliable waterproofing is provided by covering the entire outer surface of the actuator body (26) with the coating (30). Therefore, waterproofing can be provided more reliably, and safety can be further increased. The other effects and advantages are the same as those in Embodiment 1.

<Embodiment 3>

Figure 7:
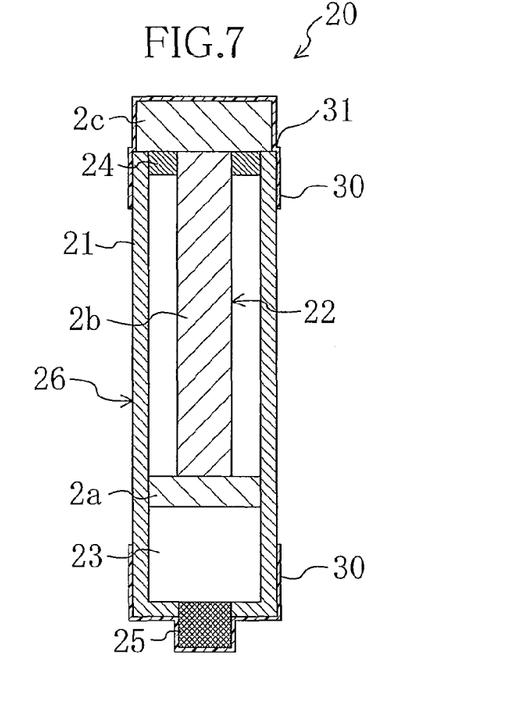
FIG. 7 is a longitudinal sectional view of an explosive actuator of Embodiment 3.

According to Embodiment 1, the entire actuator body (26) is covered with the coating (30), whereas according to the present embodiment, only an end portion of the actuator body (26) is covered with the coating (30) as shown in FIG. 7.

Specifically, the coating (30) covers the outer surfaces of the open end and the closed end of the cylinder (21), and the outer surface of the middle portion of the cylinder (21) is exposed. That is, the coating (30) covers the outer surface of the closed end of the cylinder (21) surrounding the gas generator (25), and the outer surface of the open end of the cylinder (21) surrounding the projecting portion of the piston (22). The other structures, effects and advantages are the same as those in Embodiment 1.

<Embodiment 4>

Figure 8:
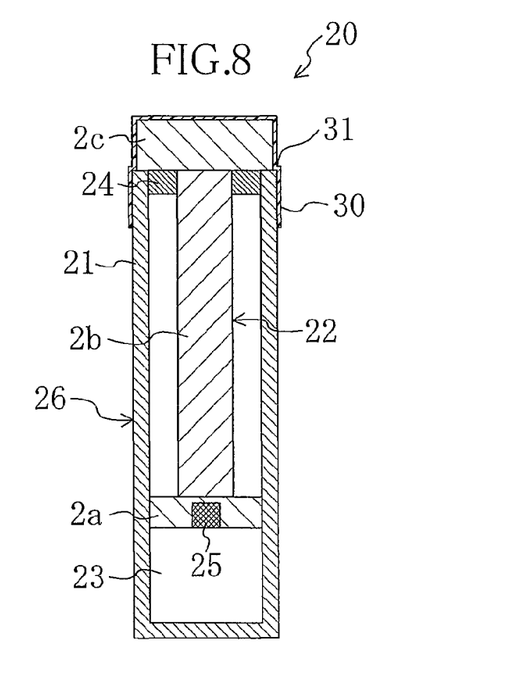
FIG. 8 is a longitudinal sectional view of an explosive actuator of Embodiment 4.

According to the Embodiment 2, the entire actuator body (26) is covered with the coating (30), whereas according to the present embodiment, only an end portion of the actuator body (26) is covered with the coating (30) as shown in FIG. 8.

Specifically, the coating (30) is provided so as to cover the outer surface of the open end of the cylinder (21), and the outer surfaces of the closed end and the middle portion of the cylinder (21) are exposed. That is, since the gas generator (25) is provided in the interior of the cylinder (21), the coating (30) is provided to cover only the outer surface of the open end of the cylinder (21) surrounding the projecting portion of the piston (22). The other structures, effects and advantages are the same as those in Embodiment 2.

<Other Embodiments>

The present invention may have the following structures in each of the above embodiments.

Although the explosive actuator (20) in the above embodiments is used to lift the engine hood (3), the present invention may be used to drop the engine in a collision, or is not limited to use for vehicles. In other words, the present invention can be used for anything as long as it is an explosive actuator having a powder-actuated piston (22).

The coating (30) is not limited to a resin in the first aspect of the present invention.

The above coating (30) is made of a resin coating having electrically insulating, waterproof, and dustproof characteristics. However, as a matter of course, the coating (30) may be made of any one of a coating having only electrically insulating characteristics, and a coating having only waterproof characteristics, and a coating having only dustproof characteristics. Further, the coating (30) may be made of any one of a coating having only the electrically insulating and waterproof characteristics, a coating having only the electrically insulating and dustproof characteristics, and a coating having only the waterproof and dustproof characteristics. Moreover, the coating (30) may be made of a coating having oil resistance characteristics or chemical resistance characteristics, or in addition to these characteristics, the coating (30) may be made of a coating having all the above-described characteristics, such as waterproofing characteristics.

The above-described coating (30) is fractured by the projection of the piston (22). However, the coating (30) may be made of a flexible material and can be extend without a fracture.

The above-described coating (30) includes the thinned portion (31). However, the entire coating (30) may have a generally uniform thickness.

The above-described piston (22) is structured such that one rod portion (2b) projects. However, the rod portion (2b) may be a series of rod portions which extend by sliding like a telescope.

In the above embodiments, a powder is used as a gas generating agent for the gas generator (25). However, the gas generating agent is not limited to a powder, but may be anything that generates gas as a result of a reaction.

The above embodiments are essentially preferable examples which are not intended to limit the present invention, its application, or its range of range of use.

Industrial Applicability

As described above, the present invention is useful as a gas pressure actuator in which a piston is moved by high pressure gas generated by a reaction of a gas generating agent.

The invention claimed is:

1. A gas pressure actuator whose actuator body has
   a cylinder,
   a piston having an end portion exposed from an end portion of the cylinder, and
   a gas generator in which a gas generating agent is loaded, the gas generator injecting a high pressure gas into the cylinder as a result of a reaction of the gas generating agent, and thereby allowing the piston to project and move m the cylinder, thereby actuating the piston only one time, wherein
   the actuator body is provided with a coating in an end portion of the actuator body at a side from which at least the piston is exposed,
   the coating being fractured by the actuation of the piston projecting and moving from the cylinder by the high pressure gas injected from the gas generating agent, and covering an area ranging from the end portion of the piston to the end portion of the cylinder from outside.

2. The gas pressure actuator of claim 1, wherein the coating covers the entire actuator body from outside.

3. The gas pressure actuator of claim 1 or 2, wherein the coating is a resin coating having waterproof characteristics.

4. The gas pressure actuator of claim 1 or 2, wherein the coating is a resin coating having dustproof characteristics.

5. The gas pressure actuator of claim 1 or 2, wherein the coating is a resin coating having electrically insulating characteristics.

6. The actuator of claim 1, wherein the coating includes a thinned portion on a circumferential surface of the actuator body at a contact portion between the cylinder and the piston.

7. The actuator of claim 1, wherein the gas generator is positioned at an end portion of the cylinder.

8. The actuator of claim 1, wherein the gas generator is positioned at an end portion of the piston inside the cylinder.

* * * * *